Patented Jan. 17, 1928.

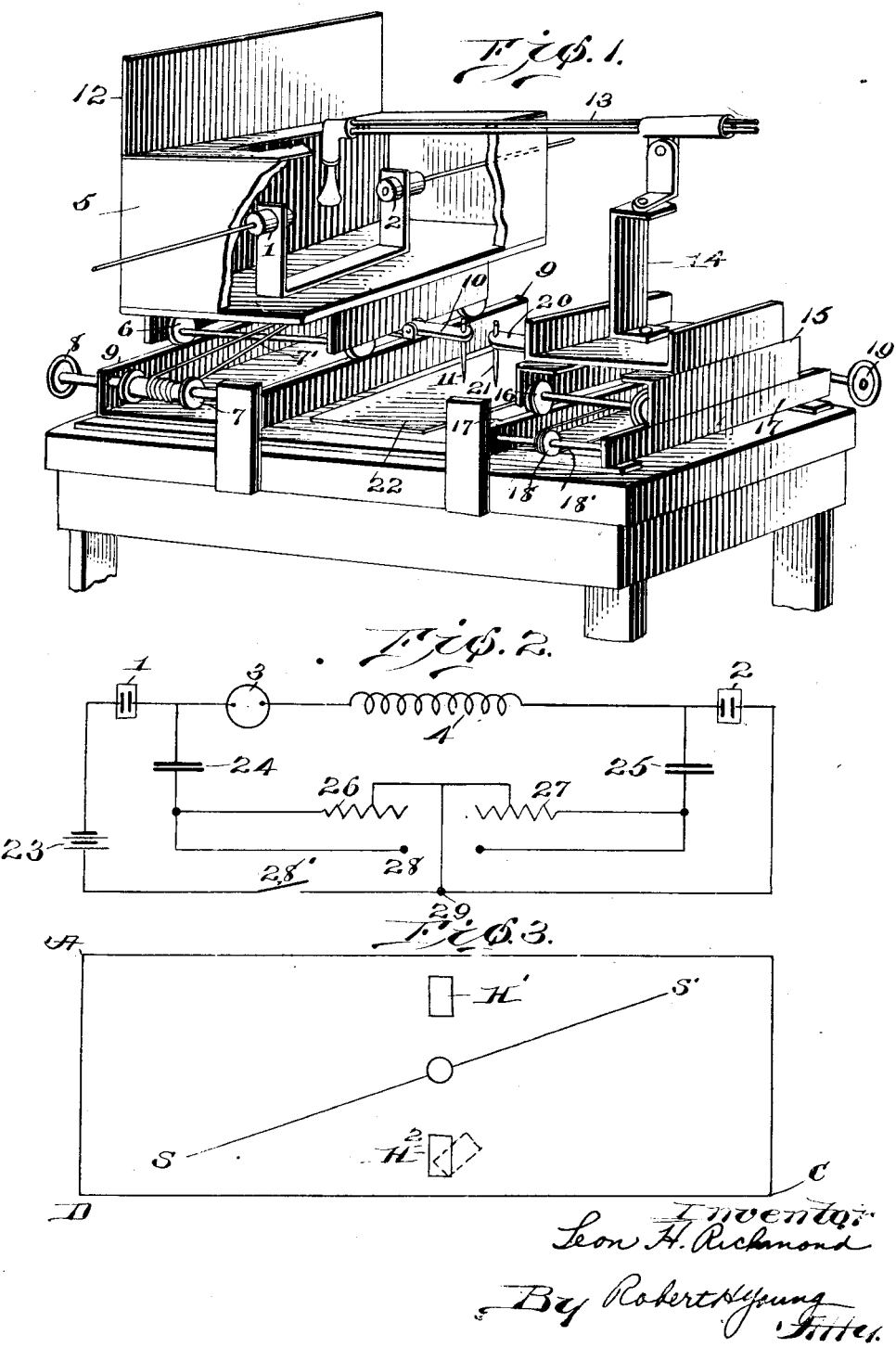

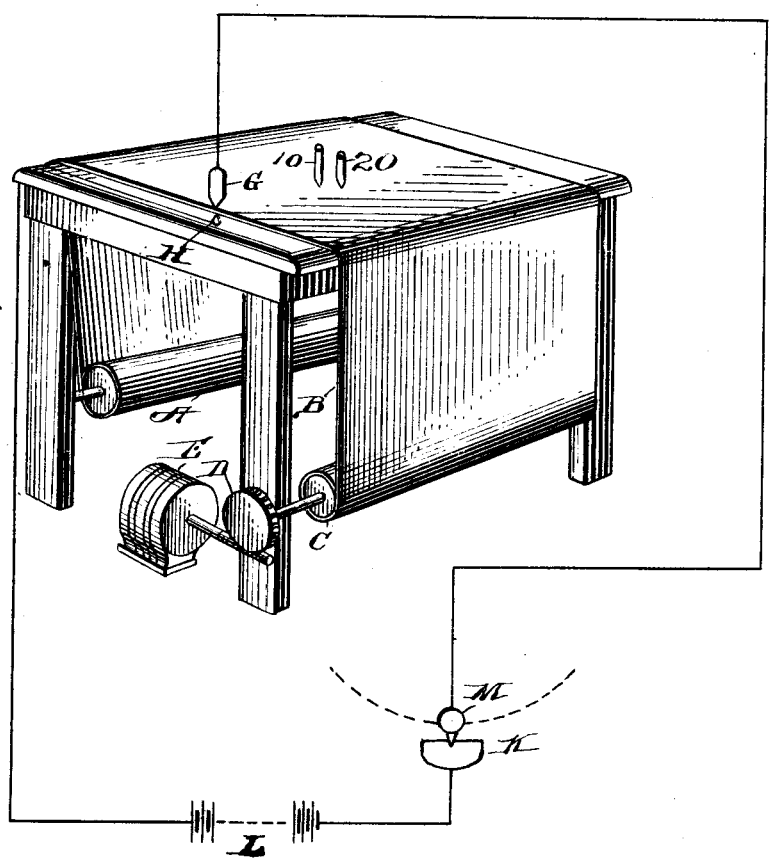

1,656,533

UNITED STATES PATENT OFFICE.

LEON H. RICHMOND, OF FORT H. G. WRIGHT, NEW YORK.

SOUND-DETECTION TRAINING DEVICE.

Application filed October 4, 1926. Serial No. 139,539.

This invention relates to a laboratory apparatus for the testing and training of an individual's binaural sense or the degree of equality of sound detection of one ear with respect to the other.

An object of my invention is to provide such an apparatus that will allow of the transmission of sound from a single source to each ear of the observer, the apparatus being so constructed that the instructor may secretly so operate the same that the source of sound is nearer one of the observer's ears than the other; and that the observer may also independently reset the sound reception apparatus, and without moving the sound source, in such a position in which in his judgment, as a result of his binaural sense alone, the sound is reaching both ears simultaneously.

Another object of my invention is to provide the apparatus with indicating and recording devices whereby the degree of accuracy of the observer's observations may be definitely determined in order to test and train his ability at this particular type of sound detection.

To this end I propose to provide an apparatus comprising a moving source and a moving base. To accomplish this I employ a hydrophone at each end of and submerged in a tank of water, with a connection to the corresponding ear of the observer. The movement by the observer of the tank containing the hydrophones with relation to the instructor's setting of the source of sound, enables the observer to bring the source midway between the two hydrophones by means of his binaural sense without the aid of vision. The degree of accuracy in accomplishing this is a comprehensive test of his binaural observation ability.

With the foregoing and other objects in view, my invention consists in the combination of parts and in the details of construction set forth hereinafter, certain embodiments thereof being illustrated in the accompanying drawings, in which:

Fig. 1 is a view in perspective and partly in section of the mechanical elements of my device.

Fig. 2 is a diagrammatical illustration of the electrical wiring system.

Fig. 3 is a diagrammatical sketch of a modified form of the system.

Fig. 4 is a diagrammatical view in perspective of the device for recording the movements of the base line.

Referring more particularly to the drawings, it will be seen that my device has a fixed-length base line which may be moved along its own length, and a source of sound which may be moved in the same direction as the base line, but independent thereof. The device as constructed has two hydrophones 1 and 2, one at each end of a tank of water. The tank is mounted on wheels which run on a track parallel to the line joining the two hydrophones. The source of sound is mounted on a separate track parallel to the first. The relative movements of these two enable the source of sound to be brought at the midpoint between the hydrophones by the movement of either one. This feature is used in the binaural training and experiment.

The detail description of the device falls into two parts, mechanical and electrical. The mechanical features include a tank of wood 5 which is preferably lined throughout with sound absorbent material, which when wet, has been found to give very little sound reflection. At each end of the tank a hydrophone is suitably held submerged in the water as shown at 1 and 2. The tank is preferably covered with a top of sheet metal having a long slit opening. This is for the purpose of preventing the water in the tank from splashing out when the tank is moved rapidly. The tank is filled with water to within approximately an inch from the top. The tank is mounted on a small four-wheel truck having wheels 6 which roll on a track 9, which parallel to the length of the box. A cable 7' is attached to the small truck and to a pulley 7 on the observer's side of the apparatus in such a manner that the turning of the knob 8 will move the truck and consequently the tank in either direction desired. At one side of the tank is fastened an upright sheet 12 of sound absorbent material which prevents the observer from seeing the relative setting of the source of sound and the hydrophones. It is also conveniently used to carry the various electrical instruments making up the electrical circuits.

There is a similar track 17 close to and parallel with the first track 9. This track is also provided with a truck 15 having wheels 16 and a pulley 18 and cable 18' operated by the knob 19. All of this is located on the instructor's or recorder's side of the apparatus in such a manner that it may be operated without the observer seeing such operation. The truck 15 has an upright piece 14 which carries the arm 13 to which is attached a suitable source of sound. The present source of sound in use is a very fine jet of air bubbles which issues from a nozzle attached to the truck. A heavy arm 20 carrying a pencil 21 is hinged to the truck 15 directly under the arm 13 carrying the source of sound. A similar arm 10 carrying a pencil 11 is hinged to the truck 5 carrying the tank and is attached at a point midway between the two hydrophones which form the base line. The weight of the arms is sufficient to cause the pencils to record the settings on the record sheet 22.

This apparatus is so mounted on a table that there is room for paper to be drawn underneath it in a direction at right angles to the movement of the truck.

A diagram of the electrical circuit is shown in Fig. 2. This circuit is especially designed to avoid operating troubles and to supply the same amount of energy current through each hydrophone. The circuit of the energizing current (direct current) is from the battery 23, through one hydrophone 1, through a milliammeter 3, a heavy iron-cored choke coil 4, through the other hydrophone 2, and back to the battery 23. A single pole single-throw switch 28' in the circuit enables the making and breaking of the circuit. The alternating current component originated by the action of the hydrophone is, from the hydrophone 1, through a ¼ microfarad condenser 24 through one earphone which is connected to the terminals 28 and 29, through the battery 23 and back to the hydrophone 1. The path of the alternating current, originating in the other hydrophone 2, is exactly similar except that it has no battery. The function of the choke coil is to prevent the alternating current component arising in one hydrophone from getting into the alternating current circuit of the other hydrophone. In this manner cross talk is prevented. The function of the two condensers 24 and 25 is to prevent battery current passing through the earphones. Each earphone is shunted by its corresponding variable resistance 26 or 27, by the use of which the intensity of sound may be controlled.

The whole device is on a table measuring 3¼' x 1¾'. Its height from the table, including the sheet of celotex, is 2½'. The total weight, without the water, is approximately 100 pounds. In addition to the device as described, there must be provided some source of air pressure if an air bubble source of noise is to be used.

There are no special precautions to be observed in building the apparatus. In the electrical circuit, however, every care should be taken to see that the A. C. circuits are equal and balanced. The apparatus should be tested to make sure that the choke coil is heavy enough to prevent cross talk. This can be done by gently rubbing one hydrophone and listening to the receiver attached to the other one. No sound should come through. The earphones used should be binaurally matched. The hydrophones also must be matched binaurally and should have practically the same resistance.

The operation is very simple. The observer takes his position behind the apparatus and turns on the battery current. This current has a normal value which, if exceeded, as shown by the reading of the milliammeter, is brought down by smartly rapping the tank, thus unpacking the hydrophones. The training then proceeds by the instructor moving the source of sound to any position and the observer moving the tank until his binaural sense informs him that the sound is midway between the hydrophones. A great many variations of this is possible.

The apparatus for recording the movements of the baseline as an observer follows a moving source has not yet been added to the device. It consists of a small motor geared down to turn a roll at a slow and constant speed. From a supply roll paper is led over the top of the table but under the apparatus including the two recording pencils to the motor-turned roll. The pencils mark the path of their movements as the paper passes under them. The time element is determined by the rate of speed at which the roll turns and its diameter. If a more refined time measurement is needed, it can be done by having a pendulum actuate a coil so that each swing will cause a spark to pass thru the paper when proper arrangements are made for it.

Let the table in the accompanying figure represent the table shown in Fig. 1. Let the paper 11, Fig. 1 be replaced by a continuous sheet of paper, B supplied from a roll A and moved along by being rolled on the roller C. The roller C is driven by a constant speed motor E and suitable gears D. Resting on the paper are the two pencils 10 and 20, (also shown in Fig. 1). These pencils should be of different colors. Now as the paper moves at right angles to the movements of the pencils, there will be a record impressed on it which will show the relative movements of the two pencils. As the pencils are rigidly attached to the baseline, the base line movements are recorded. The relative movements can be converted into time movements by calibrating the apparatus to determine how fast the paper moves.

If more refined time measurements are desired they may be obtained as follows:

Let G be a sharp pointed insulated terminal mounted flush with the table. Immediately above it but separated by a distance just sufficient to allow paper to pass is another insulated electrode G. To each electrode is connected a battery L and in the circuit is a pendulum with a bob M passing through a cup of mercury K. The pendulum beats to regular time intervals and these time intervals are registered on the paper by a spark passing between G and H thus producing a characteristic mark on the paper. The pendulum may be calibrated to as high a degree of precision as necessary.

A different arrangement of the tank and the path of the source of sound will permit of the moving of the base line or the source of sound so as to give a maximum effect as well as a binaural effect. How this is done can be readily seen by Figure 3, in which ABCD is the outline of the tank, SS' is the path of the source of sound, and $H^1$ and $H^2$ are the hydrophones. It is seen that as the source moves towards the midpoint O, it imparts greater energy to the hydrophones, thus increasing the intensity of the sound. In order to get this to be the greatest energy in each hydrophone at the midpoint of the path, it is necessary to turn the hydrophones at some angles such as shown by the dotted lines. The effect of this is to turn the face of the hydrophone away from the source when it is near the hydrophone, thus causing the hydrophone to pick up less energy. The correct angle could be determined by experiment.

Having thus described my invention, I claim:

1. In a sound detection apparatus, a single source of sound, a pair of sound responsive members and means attached thereto to permit of aural reception by an observer, means for moving said source of sound to vary the relative position thereof with respect to the two sound responsive members, and independent means operable by said observer for moving said sound responsive members equidistantly from said source of sound in accordance with his binaural observations.

2. In a sound detection apparatus, a single source of sound, a pair of sound responsive members and means attached thereto to permit of aural reception by an observer, means for moving said source of sound, visually unobserved by said observer, to vary the relative position thereof with respect to the two sound responsive members, and independent means operable by said observer for moving said sound responsive members equidistantly from said source of sound in accordance with his binaural observations, and means for recording the various settings for the purpose of testing the degree of the observer's accuracy.

In testimony whereof I affix my signature.

LEON H. RICHMOND.